(12) United States Patent
Lacy et al.

(10) Patent No.: US 8,523,527 B2
(45) Date of Patent: Sep. 3, 2013

(54) APPARATUS FOR COOLING A PLATFORM OF A TURBINE COMPONENT

(75) Inventors: Benjamin Paul Lacy, Greer, SC (US); Gary Michael Itzel, Simpsonville, SC (US); Bin Wei, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 847 days.

(21) Appl. No.: 12/721,040

(22) Filed: Mar. 10, 2010

(65) Prior Publication Data

US 2011/0223004 A1 Sep. 15, 2011

(51) Int. Cl.
*F01D 5/18* (2006.01)

(52) U.S. Cl.
USPC ..................................... 416/97 R; 416/193 A

(58) Field of Classification Search
USPC .................. 416/96 R, 97 R, 193 A; 415/115
See application file for complete search history.

(56) References Cited

U.S. PATENT DOCUMENTS

| | | | |
|---|---|---|---|
| 4,119,390 A * | 10/1978 | Dakin et al. ................ | 416/96 R |
| 4,353,679 A * | 10/1982 | Hauser .......................... | 415/115 |
| 5,059,289 A | 10/1991 | Gaskell | |
| 5,281,084 A | 1/1994 | Noe et al. | |
| 5,486,093 A | 1/1996 | Auxier et al. | |
| 5,813,835 A * | 9/1998 | Corsmeier et al. .......... | 416/97 R |
| 5,837,239 A | 11/1998 | Hirai et al. | |
| 5,993,155 A | 11/1999 | Endres et al. | |
| 6,017,189 A * | 1/2000 | Judet et al. .................. | 416/97 R |
| 6,190,130 B1 | 2/2001 | Fukue et al. | |
| 6,390,774 B1 | 5/2002 | Lewis et al. | |
| 6,431,833 B2 | 8/2002 | Jones | |
| 6,478,540 B2 | 11/2002 | Abuaf et al. | |
| 6,644,920 B2 | 11/2003 | Beeck et al. | |
| 7,147,439 B2 | 12/2006 | Jacala et al. | |
| 7,695,247 B1 * | 4/2010 | Liang .......................... | 416/97 R |
| 7,819,629 B2 * | 10/2010 | Liang .......................... | 416/97 R |
| 8,096,772 B2 * | 1/2012 | Liang .......................... | 416/97 R |
| 2006/0263221 A1 | 11/2006 | Cunha et al. | |
| 2007/0116574 A1 | 5/2007 | Itzel et al. | |
| 2007/0201979 A1 * | 8/2007 | Veltre et al. ................. | 416/97 R |

FOREIGN PATENT DOCUMENTS

| EP | 1788192 A2 | 5/2007 |
|---|---|---|
| FR | 2359976 A1 | 2/1978 |

OTHER PUBLICATIONS

U.S. Appl. No. 12/562,528, filed Sep. 18, 2009.
Search Report and Written Opinion from EP Application No. 11157347.3 dated Apr. 18, 2013.

* cited by examiner

*Primary Examiner* — Ninh H Nguyen
(74) *Attorney, Agent, or Firm* — Dority & Manning, P.A.

(57) ABSTRACT

The present subject matter discloses a turbine component including a platform and an airfoil extending radially upward from the platform. A plurality of curved cooling passages may be defined in the platform. Each of the curved cooling passages may have at least one end disposed at an exterior surface of the platform. Additionally, each of the cooling passages may be configured to direct a cooling medium through the platform.

20 Claims, 5 Drawing Sheets

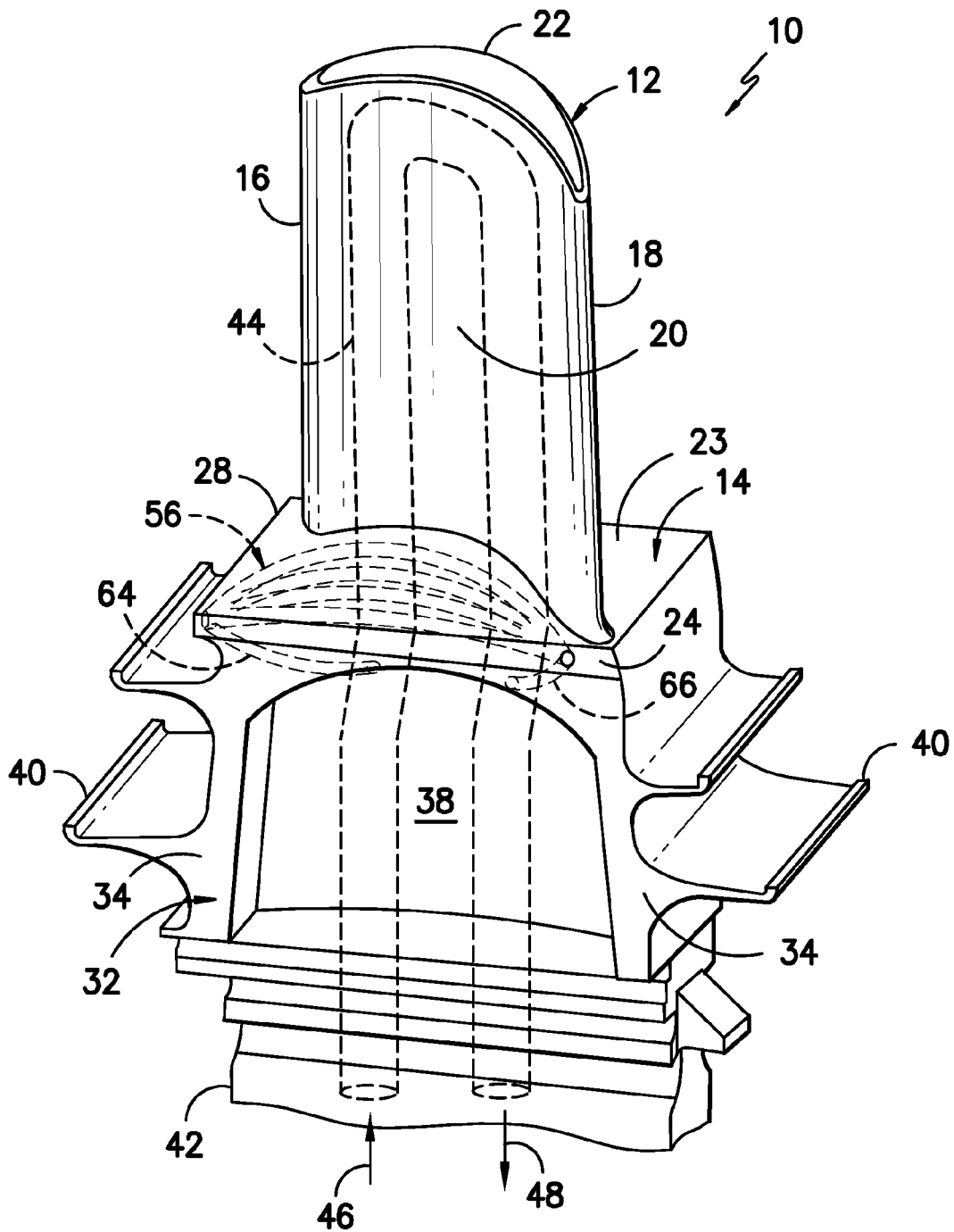
FIG. -1-

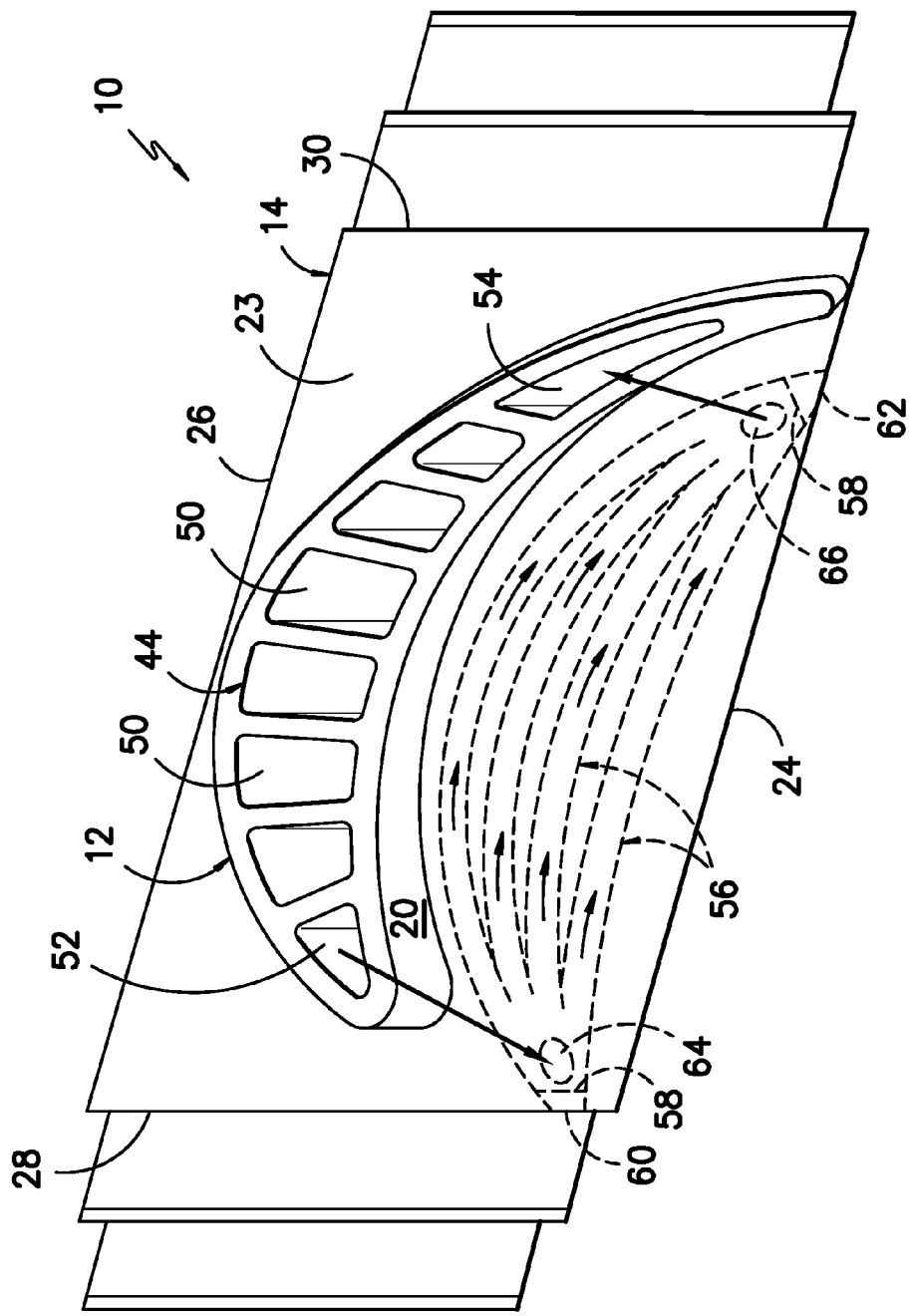
FIG. -2-

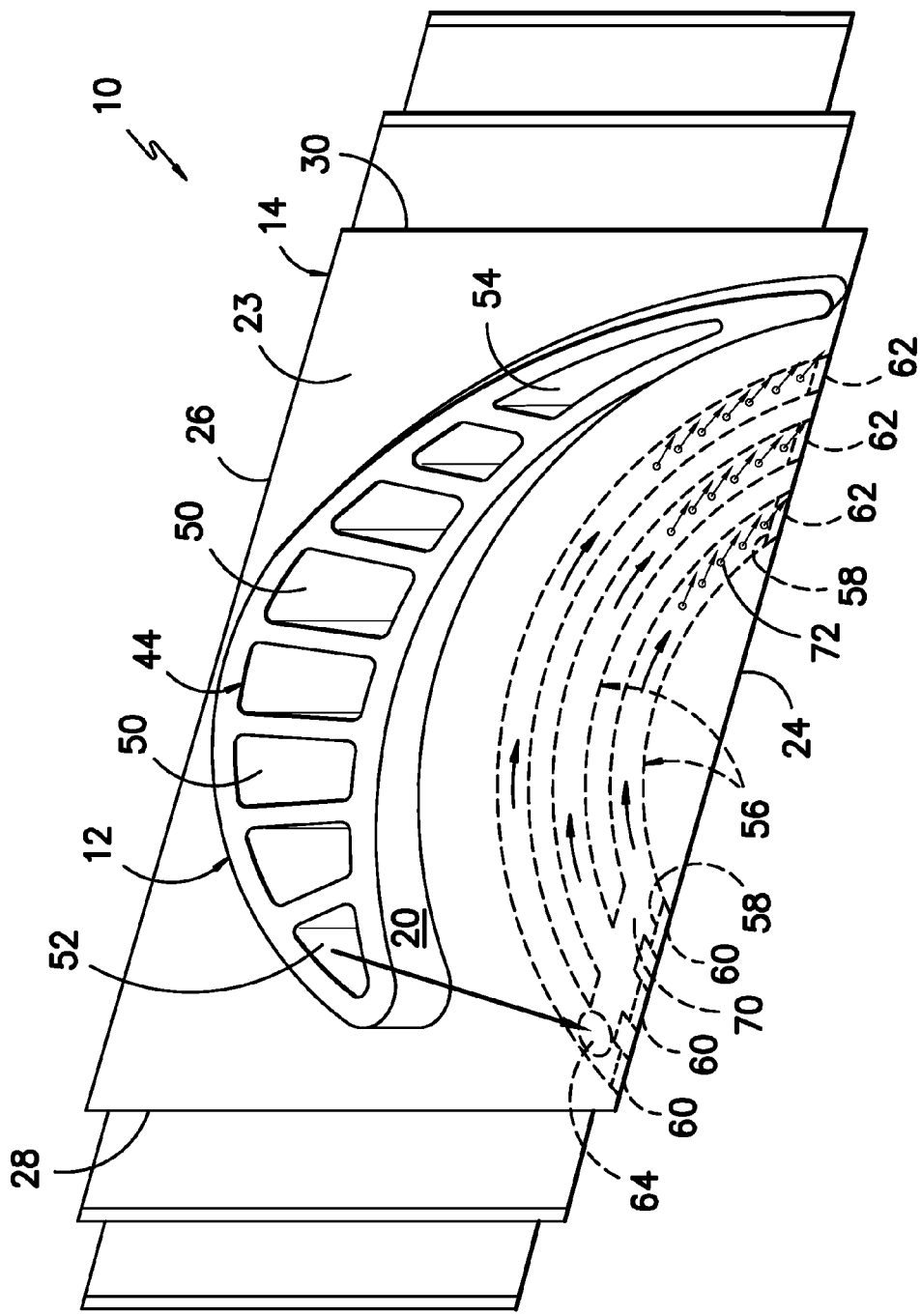

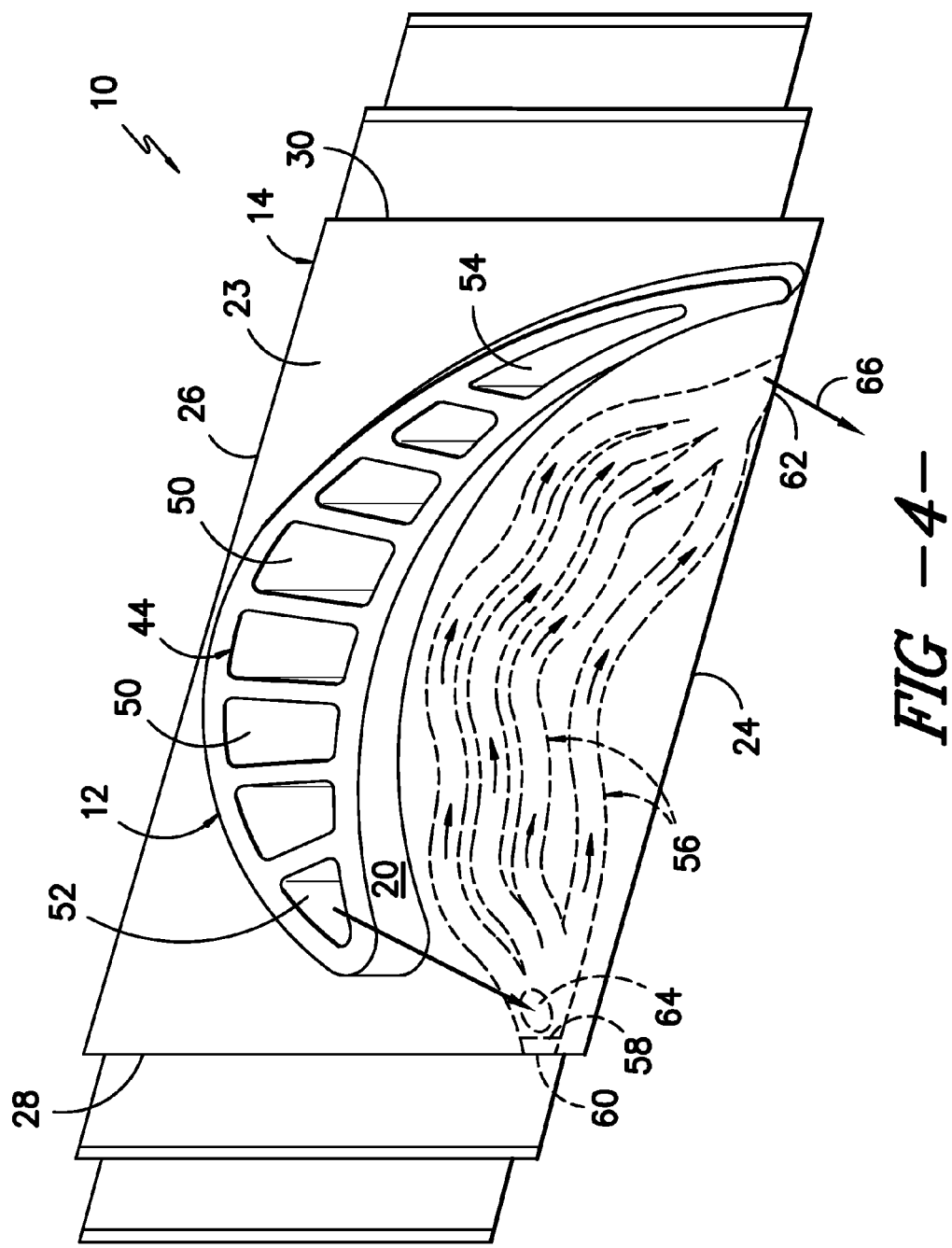
FIG -4-

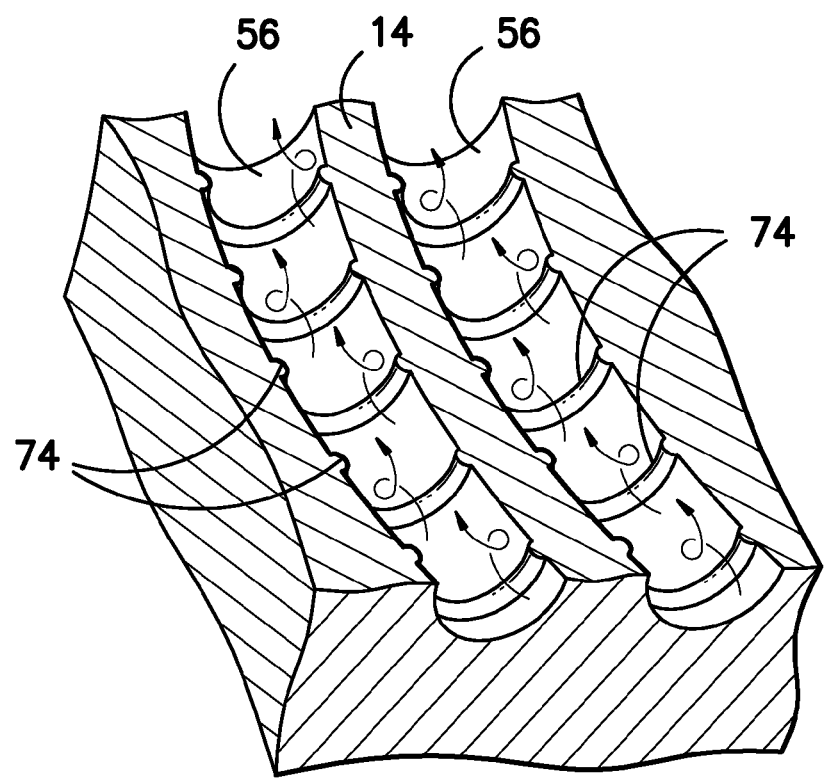
FIG. —5—

APPARATUS FOR COOLING A PLATFORM OF A TURBINE COMPONENT

FIELD OF THE INVENTION

The present subject matter relates generally to an apparatus for cooling a platform of a turbine component and particularly to a turbine component with curved cooling passages to cool the component's platform.

BACKGROUND OF THE INVENTION

In a gas turbine, hot gases of combustion flow from an annular array of combustors through a transition piece for flow along an annular hot gas path. Turbine stages are typically disposed along the hot gas path such that the hot gases of combustion flow from the transition piece through first-stage nozzles and buckets and through the nozzles and buckets of follow-on turbine stages. The turbine buckets may be secured to a plurality of turbine wheels comprising the turbine rotor, with each turbine wheel mounted to the rotor shaft for rotation therewith.

A turbine bucket generally includes an airfoil having a pressure side and a suction side and extending radially upward from a horizontal, substantially planar platform. A hollow shank portion extends radially downward from the platform and may include a dovetail or other means to secure the bucket to a turbine wheel. The bucket platform generally defines the inner flow path boundary of the combustion products flowing through the hot gas path. Accordingly, due to the high temperatures of the combustion products and mechanical loading on the bucket, the platform may be an area of high stress concentrations. In order to alleviate a portion of the thermally induced stress, a turbine bucket may include some type of platform cooling scheme or arrangement to reduce the temperature differential between the top and bottom of the platform.

Various platform cooling arrangements are known in the art. For example, a known cooling arrangement includes a plurality of film cooling holes defined in a turbine bucket between the shank portion and the platform. Cooling air is introduced into the hollow cavity of the shank portion and is directed through the film cooling holes to cool the platform in the localized region of the holes. However, it has been found that such film cooling provides less than optimal cooling for the bucket platform and also requires the use of an excessive amount of air. Another known cooling arrangement includes a cored platform, wherein the platform defines a cavity through which cooling medium may be supplied. However, a cored platform provides limited design flexibility for improving the performance of the cooling arrangement. Moreover, the process of forming the cored platform can be both expensive and difficult to accomplish.

Accordingly, a cooling arrangement for a turbine component, such as a turbine bucket, that effectively cools the component's platform and that is relatively easy to manufacture would be accepted in the technology.

BRIEF DESCRIPTION OF THE INVENTION

Aspects and advantages of the invention will be set forth in part in the following description, or may be obvious from the description, or may be learned through practice of the invention.

In one aspect, the present subject matter provides a turbine component including a platform and an airfoil extending radially upward from the platform. A plurality of curved cooling passages may be defined in the platform. Each of the curved cooling passages may have at least one end disposed at an exterior surface of the platform. Additionally, each of the cooling passages may be configured to direct a cooling medium through the platform.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a turbine bucket in accordance with an aspect of the present subject matter;

FIG. 2 illustrates a top plan view of an embodiment of a turbine bucket in accordance with an aspect of the present subject matter;

FIG. 3 illustrates a top plan view of another embodiment of a turbine bucket in accordance with an aspect of the present subject matter;

FIG. 4 illustrates a top plan view of a further embodiment of a turbine bucket in accordance with an aspect of the present subject matter; and FIG. 5 illustrates a top cross-sectional view of two turbulated, curved cooling passages in accordance with an aspect of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a cooling arrangement for a turbine component. In particular, the present subject matter is directed to a turbine component with a plurality of curved cooling passages defined in the platform of the component. Generally, the arrangement or pattern of the cooling passages within the platform may be varied to provide enhanced design flexibility. Such flexibility can be utilized to improve the overall cooling performance of the cooling passages by optimizing the amount of cooling medium supplied to particular areas of the platform. Additionally, the curved cooling passages may be relatively easy and inexpensive to manufacture, and thus, can provide a cost-effective alternative to other known cooling arrangements.

Initially, it should be appreciated that, while the cooling passages of the present subject matter will be described herein as being defined in a turbine bucket of a gas turbine, the cooling passages may be generally defined in any turbine component having a platform, such as at the base of an airfoil, that necessitates cooling. Thus, for example, the cooling passages may also be defined in a compressor or rotor blade disposed within a compressor of the compressor section of a gas turbine. Additionally, application of the present subject matter need not be limited to gas turbines, but may also be used in steam turbines. Further, it should be appreciated that the present subject matter may be applicable to turbines used for power generation, as well as those used in aviation for propulsion.

Referring to the drawings, FIG. 1 illustrates a turbine bucket 10 for a gas turbine. The bucket 10 generally includes an airfoil 12, a shank portion 32, and a platform 14 disposed between the airfoil 12 and shank portion 32. The airfoil 12 generally extends radially upward from the platform 14 and includes a leading edge 16 and a trailing edge 18. Additionally, the airfoil 12 may include a concave wall defining a pressure side 20 of the airfoil 12 and a convex wall defining a suction side 22 of the airfoil 12. The platform 14 of the turbine bucket 10 may be generally arranged so as to be horizontal and substantially planar. Additionally, the platform 14 may include various exterior surfaces. For example, the platform may include a top surface 23 and exterior faces generally defining the sides of the platform 14. Specifically, as shown in FIG. 2, the platform 14 may include a pressure face 24, a suction face 26, a forward face 28 and an aft face 30. The shank portion 32 of the turbine bucket 10 may extend radially downward from the platform 14 such that the platform 14 generally defines an interface between the airfoil 12 and the shank portion 32. The shank portion 32 may include sides 34, a hollow cavity 38 partially defined by the sides 34 and one or more angel wings 40 extending horizontally from each side 34. Additionally, the shank portion may include a root structure 42, such as a dovetail, configured to secure the bucket 10 to a turbine wheel (not illustrated) of the turbine rotor of a gas turbine.

The turbine bucket 10 may also include an airfoil cooling circuit 44 at least partially disposed in the airfoil 12 for flowing a cooling medium, such as air or steam, through the airfoil 12. Generally, it should be appreciated that the airfoil cooling circuit 44 of the bucket 10 may have various configurations. For example, one embodiment of an airfoil cooling circuit 44 is depicted in FIG. 1. As shown, the cooling circuit 44 comprises a closed loop two-pass cooling circuit, wherein the cooling medium enters through a supply passage 46 and exits through a return passage 48. However, one of ordinary skill in the art should appreciate that the cooling circuit 44 may have any number of passes or cooling channels for cooling the airfoil 12. For example, an alternative embodiment of an airfoil cooling circuit 44 is illustrated in FIG. 2. As shown in plan view, the airfoil cooling circuit 44 includes a plurality of cooling channels 50 extending radially inward and outward along the airfoil 12. Thus, in one embodiment, the cooling channels 50 may be part of a closed loop cooling circuit and define a serpentine-like path such that the cooling medium may be directed throughout the airfoil 12. In particular, the cooling medium may enter the leading edge channel 52 and alternately flow radially outwardly and radially inwardly through the various channels 50 for return through the trailing edge channel 54. It should also be appreciated that the airfoil cooling circuit 44 need not be limited to a single supply passage 46, but may generally have multiple supply passages 46, either isolated or in flow communication, through which the cooling medium enters the bucket 10. Moreover, in a further embodiment, the airfoil cooling circuit 44 may comprise an open cooling circuit. Thus, for example, the airfoil cooling circuit 44 may comprise a single or multiple pass cooling circuit, wherein the cooling medium exits through a plurality of film holes or trailing edge cooling holes (not illustrated) defined in the airfoil 12.

In accordance with an aspect of the present subject matter, the turbine bucket 10 may also include a plurality of curved cooling passages 56 defined in the platform 14 on the concave or pressure side 20 of the airfoil 12, various embodiments of which are illustrated in FIGS. 1-4. Each of the curved cooling passages may be supplied with a cooling medium, such as air, steam, or any other suitable cooling fluid. As such, the cooling passages 56 may be configured to direct the cooling medium through the platform 14 to provide a preferential cooling arrangement for the platform 14. In an exemplary embodiment, the cooling passages 56 may be in flow communication with the airfoil cooling circuit 44 such that the cooling medium may be supplied to the cooling passages 56. However, it should be appreciated that the cooling passages 56 may be in flow communication with any suitable bucket cooling circuit, with the flow of cooling medium entering from a higher pressure circuit and exiting through a lower pressure circuit.

Generally, it should be appreciated that the curved cooling passages 56 of the present subject matter may be formed within the platform 14 by any suitable means. For example, the curved cooling passages 56 may be formed by an electrical discharge machining ("EDM") process or by a casting process. However, in an exemplary embodiment, the curved cooling passages 56 may be formed by a curved shaped-tube electrochemical machining ("STEM") process. The curved STEM process is generally disclosed in application Ser. No. 12/562,528 Curved Electrode and Electrochemical Machining Method and Assembly Employing the Same filed on Sep. 18, 2009 and assigned to the General Electric Company. Generally, unlike a conventional STEM drilling process, the curved STEM process utilizes a curved STEM electrode operatively connected to a rotational driver. The rotational driver is configured to move the electrode along a curved path within an object to be machined, such as a bucket platform 14. As the rotational driver rotates the curved electrode along the curved path, a pulsed voltage supplied to the electrode from a power source allows portions of the object to be machined to be electroeroded away to define a curved passage within the object.

Referring to FIGS. 1 and 2, one embodiment of a turbine bucket 10 is illustrated in accordance with an aspect of the present subject matter. As shown, a plurality of curved cooling passages 56 of differing radii may be defined in the platform 14 on the pressure side 20 of the airfoil 12. In particular, the radii of the cooling passages 56 may become progressively smaller as the passages 56 extend away from the pressure face 24 of the platform 14 and in the direction of the concave wall of the airfoil 12. As such, the curvature of the cooling passages 56 may generally conform to the concave shape of the pressure side 20 of the airfoil 12. Thus, the cooling passages 56 may permit a cooling medium, such as air, steam or the like, to be supplied throughout a substantial portion of the platform 14 and, in particular, allow an area of the platform 14 in close proximity to the airfoil 12 to be effectively cooled.

Referring still to FIG. 2, the curved cooling passages 56 may be formed non-concentrically within the platform 14. As used herein, the term "non-concentric" should be understood to mean that the curved cooling passages 56 do not share a common center point. Additionally, the curved cooling passages 56 may be formed in the platform 14 such that each cooling passage 56 originates and terminates from substantially the same locations on an exterior surface of the platform 14. Thus, as shown in FIG. 2, the cooling passages 56 may generally define a first originating end 60 disposed at the forward face 28 of the platform 14 and a second terminating end 62 disposed at the pressure face 24 of the platform 14. This arrangement may permit each of the cooling passages 56 to be directly supplied with cooling medium from a common cooling medium inlet 64 and expel the cooling medium through a common cooling medium outlet 66. For example, as illustrated in FIG. 1, a cooling medium inlet 64 may be defined in the turbine bucket 10 between the cooling passages 56 and the airfoil cooling circuit 44 such that each of the cooling passages 56 is in direct flow communication with the airfoil cooling circuit 44. As particularly shown in FIG. 2, the cooling medium inlet 64 may divert the cooling medium flowing through the leading edge channel 52 of the airfoil cooling circuit 44 (the flow of cooling medium being generally illustrated by the arrows) to each of the cooling passages 56. Alternatively, the cooling medium inlet 64 may be in flow communication with a high pressure supply channel from any other suitable bucket cooling circuit to supply the cooling medium to the cooling passages 56. It should be appreciated that the cooling medium inlet 64 may be formed in the bucket 10 by any suitable means, such as by drilling, casting, or the like. In a particular embodiment, a curved cooling medium inlet 64, connecting the cooling passages 56 to the airfoil cooling circuit 44, may be formed utilizing the curved STEM process.

Moreover, as indicated above, the curved cooling passages 56 may expel the cooling medium flowing through each cooling passage 56 by a common cooling medium outlet 66. Thus, as illustrated in FIG. 1, a common cooling medium outlet 66 may be defined in the bucket 10 between the cooling passages 56 and the airfoil circuit 44 such that each of the cooling passages 56 is in direct flow communication with the airfoil cooling circuit 44. As particularly shown in FIG. 2, the cooling medium outlet 66 may expel the cooling medium flowing through each of the cooling passages 56 to the trailing edge channel 54 of the airfoil cooling circuit 44. In another embodiment, however, the cooling medium outlet 66 may expel the cooling medium through a low pressure channel of any other suitable bucket cooling circuit. Additionally, it should be appreciated that, in alternative embodiments, the cooling medium flowing through each of the cooling passages 56 may be expelled through a plurality of film cooling holes 72, as depicted in the embodiment of FIG. 3, or through a terminating end(s) 62 of the cooling passages 56, as depicted in the embodiment of FIG. 4. Further, one or ordinary skill in the art should appreciate that the cooling passages 56 may terminate at the same or at different locations anywhere along the platform.

Additionally, one of ordinary skill in the art should appreciate that, when the curved cooling passages 56 are formed in the platform 14 by a drilling or similar process, at least one end of the cooling passages 56 may be defined through an exterior surface of the platform 14. Thus, in one embodiment, a plug 58 may be disposed at the originating end(s) 60 and/or the terminating end(s) 62 of the cooling passages 56 to prevent the cooling medium from leaking through these exterior surfaces. For example, as shown in FIG. 2, plugs 58 may be disposed at the originating end 60 and the terminating end 62 of the cooling passages to prevent any cooling medium from being expelled through the forward face 28 and the pressure face 24 of the platform 14, respectively. It should be appreciated that the plugs 58 may be formed from weld-filling the ends of the cooling passages 56 or, alternatively, an actual plug may be welded or brazed into place.

FIG. 3 illustrates an alternative embodiment of a turbine bucket 10 in accordance with an aspect of the present subject matter. The turbine bucket 10 may include a plurality of curved cooling passages 56 defined in the platform 14 on the pressure side 20 of the airfoil 12. As shown, the cooling passages 56 may be defined concentrically within the platform 14, with each cooling passage 56 having an originating end 60 and a terminating end 62 disposed at various points along the pressure face 24 of the platform 14. Additionally, as indicated above, plugs 58 may be disposed at the ends 60, 62 of the cooling passages 56.

To supply the cooling passages 56 with the cooling medium, a cooling medium inlet 64 may be defined between at least one of the cooling passages 56 and the airfoil cooling circuit 44. For example, as shown in FIG. 3, a cooling medium inlet 64 may be defined in the bucket 10 such that one of the passages 56 is in flow communication with the leading edge channel 52 of the airfoil cooling circuit 44. Additionally, a cross-over passageway 70 may be defined in the platform 14 between the cooling passages 56 to direct the cooling medium flowing from the airfoil cooling circuit 44 to any additional cooling passages 56. However, it should be appreciated that, in an alternative embodiment, a plurality of cooling medium inlets 64 may be defined in the bucket 10 such that each cooling passage 56 is directly supplied cooling medium from a cooling medium source, such as the airfoil cooling circuit 44. Additionally, it should be appreciated that the cooling passages 56 need not be supplied cooling medium from the leading edge channel 52 of the airfoil cooling circuit, but may generally receive cooling medium from any of the channels 50 of the airfoil cooling circuit 44 or form any other cooling medium source.

Further, as shown in FIG. 3, the cooling medium flowing through each of the cooling passages 56 may be expelled through a plurality of film cooling holes 72. The film cooling holes 72 may be formed through the top surface 23 of the platform 14 so as to be in flow communication with the cooling passages 56. As such, the cooling medium flowing through the cooling passages 56 may also provide film cooling for the surface of platform 14 exposed to the hot gas path. Generally, it should be appreciated that the amount, size and configuration of the film cooling holes 72 may be varied to optimize cooling performance.

FIG. 4 illustrates yet another embodiment of a turbine bucket 10 in accordance with an aspect of the present subject matter. As shown, a plurality of curved cooling passages 56 may be defined in the platform 14 on the pressure side 20 of the airfoil 12. However, in contrast to the embodiments illustrated in FIGS. 2 and 3, each cooling passage 56 may have a curvature that generally varies along the length of the passage 56. Thus, as shown in FIG. 4, each cooling passage 56 may define a serpentine-like path for the cooling medium flowing through the platform 14. It should be appreciated that the varied curvature of the cooling passages may be formed by any suitable means known in the art. For example, the serpentine shaped cooling passages 56 may be formed by a casting process. Alternatively, the cooling passages 56 may be formed by a curved STEM process, wherein the orientation of the curved STEM electrode is altered as it is moved through the platform 14.

As illustrated in FIG. 4, each of the cooling passages 56 may originate and terminate from substantially the same locations on an exterior surface of the platform 14. For example, the cooling passages 56 may generally define a first originating end 60 disposed on the forward face 28 of the platform 14 and a second terminating end 62 disposed on the pressure face 24 of the platform 14. Thus, similar to the embodiment illustrated in FIG. 2, this arrangement may permit each of the cooling passages 56 to be directly supplied with cooling medium from a common cooling medium inlet 64 and expel the cooling medium through a common cooling medium outlet 66. For instance, a cooling medium inlet 64 may be defined in the bucket 10 between the cooling passages 56 and the airfoil cooling circuit 44 such that each of the cooling passages 56 is in direct flow communication with a channel 50 of the airfoil cooling circuit 44, such as the leading edge channel 52. Additionally, a common cooling medium outlet 66 (generally depicted by the arrow) may be defined through the pressure face 24 of the platform 14 to permit the cooling medium flowing through the cooling passages to be expelled from the platform 14. For example, in one embodiment, the terminating end 62 of the cooling passages 56 may not be plugged or may be only partially plugged to allow the cooling medium to be expelled through the pressure face 24 of the platform.

One of ordinary skill in the art should appreciate that a variety of other turbine bucket cooling patterns or arrangements may be created with the curved cooling passages 56 of the present subject matter. As such, it should be appreciated that the arrangement of the cooling passages 56 may be varied significantly to modify the cooling performance of the passages 56 and provide preferential cooling of the platform 14. For example, the cooling passages 56 may originate from any of the exterior surfaces of the platform 14. Similarly, the cooling passages 56 may terminate at any of the exterior surfaces of the platform 14 or, in an alternative embodiment, the cooling passages 56 may terminate within the platform 14, itself. Additionally, it should be appreciated that the cooling passages 56 need not be defined in the platform 14 on the pressure side 24 of the airfoil 12. For example, one or more curved cooling passages 56 may be defined in the platform 14 on the suction side 22 of the airfoil 12, Alternatively, the cooling passages 56 may cross from the pressure side 24 to the suction side 22 of the airfoil 12 and vice versa.

Further, it should be appreciated that the cooling passages 56 of the present subject matter may generally have any suitable cross-section. For example, in the embodiment shown in FIG. 1, the cooling passages 56 have circular cross-section. However, in alternative embodiments, the cooling passages 56 may have an elliptical, flattened, or any other suitable non-circular cross-section depending on the desired cooling performance of the cooling passages 56. Additionally, the cross-sectional area may be varied over the length of the cooling passage 56. For instance, the size of the tooling used to form the cooling passages 56 may be changed during the manufacturing process to alter the cross-sectional area of the cooling passages. Thus, in one embodiment, a particular sized curved STEM electrode may be used to form a first section of a curved cooling passage 56 and then a smaller sized curved STEM electrode may be used to form the remainder of the cooling passage 56.

Additionally, the cooling passages 56 may be turbulated along their length. As used herein, the term "turbulated" means that the surface of the cooling passages 56 may have grooves, ridges, or otherwise have periodic surface contouring so as to introduce turbulence into the flow of the cooling medium. Thus, for example, a top cross-sectional view of an embodiment of two turbulated cooling passages 56 is illustrated in FIG. 5. As shown, the turbulated cooling passages 56 include ridges 74 formed along their length to create turbulence in the cooling medium flow. This turbulence can enhance the cooling performance of the cooling passages 56 by increasing heat transfer between the cooling medium and the platform 14. It should be appreciated that the ridges 24 need not have the exact shape and configuration as depicted in FIG. 5, but may generally have any shape and/or configuration designed to create turbulence in the flow. Thus, in alternative embodiments, the ridges 74 may have a substantially square profile and/or be formed so as to project into the platform 14 instead of into the cooling passages 56. It should also be appreciated that the ridges, grooves, or other periodic surface contouring may be formed in the surface of the cooling passages 56 by any means generally known in the art. For example, ridges and/or grooves may be formed by varying the tool feed rate of the tool used to form the cooling passages 56. Alternatively, in another embodiment, a curved STEM electrode used in the curved STEM process may only be partially covered with an insulating coating, thereby exposing sections of the electrically conductive portion of the electrode to the surface of the cooling passages 56 to create surface contouring.

Further, as depicted herein, the curved cooling passages 56 are generally defined within the platform 14 such that, at least in a lengthwise direction, the cooling passages 56 are substantially parallel to the horizontally oriented platform 14. However, it should be appreciated that, in alternative embodiments, the cooling passages 56 may be defined in the platform 14 throughout a range of planar orientations and angles. For example, the curved cooling passages 56 may be defined at an angle within the platform 14 such that the cooling passages 56 have an originating end(s) 60 at an exterior face of the platform 14, such as the pressure face 24, and having a terminating end 62 at the top surface 23 of the platform 14. Alternatively, the cooling passages 56 may be defined in the platform 14 such that the originating and terminating end(s) 60,62 of the cooling passages 56 are both disposed at the top surface 23 of the platform 14.

Moreover, it should be appreciated that the curved cooling passages 56 may be supplied cooling medium from a cooling medium source other than the airfoil cooling circuit 44. For example, the hollow cavity 38 of the shank portion 32 may be pressurized with a cooling medium, such as air, to prevent combustion products flowing in the hot gas path from being ingested between the turbine buckets 10. In such case, the cooling passages 56 may be defined in the bucket 10 such that one or more of the cooling passages 56 is in flow communication with the hollow cavity 38 and is supplied with the cooling medium flowing within the hollow cavity 38.

Additionally, it should be appreciated that the cooling passages 56 described herein may be used in conjunction with a low conductivity coating, such as a thermal barrier coating, applied to the gas path surface or top surface 23 of the platform 14 to further enhance the cooling of the platform 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine component comprising:
  a platform;
  an airfoil extending radially upward from said platform, said airfoil including a pressure side and a suction side;

a plurality of concentric curved cooling passages defined in said platform, each of said plurality of cooling passages extending between a first end and a second end, at least one of said first end or said second end being disposed at an exterior surface of said platform, each of said plurality of cooling passages defining a constant radius between said first and second ends; and wherein each of said plurality of cooling passages is configured to direct a cooling medium through said platform.

2. The turbine component of claim 1, wherein said turbine component comprises a turbine bucket.

3. The turbine component of claim 1, wherein each of said plurality of cooling passages is defined in said platform on said pressure side of said airfoil.

4. The turbine component of claim 1, wherein each of said plurality of cooling passages is turbulated along its length.

5. The turbine component of claim 1, wherein the cooling medium is supplied to said plurality of cooling passages from an airfoil cooling circuit at least partially disposed in said airfoil.

6. The turbine component of claim 1, wherein the cooling medium flowing through said plurality of cooling passages is expelled into an airfoil cooling circuit at least partially disposed in said airfoil.

7. The turbine component of claim 1, wherein the cooling medium flowing through each of said plurality of cooling passages is expelled through a plurality of film cooling holes defined through a top surface of said platform.

8. The turbine component of claim 1, wherein said first and second ends of each of said plurality of cooling passages are defined through a side face of said platform.

9. The turbine component of claim 8, further comprising a plug disposed at at least one of said first end or said second end.

10. The turbine component of claim 8, further comprising a plug disposed at said common end.

11. A turbine component comprising:
a platform;
an airfoil extending radially upward from said platform, said airfoil including a pressure side and a suction side;
a plurality of non-concentric curved cooling passages defined in said platform, each of said plurality of cooling passages being configured to direct a cooling medium through said platform, each of said plurality of cooling passages extending from a common end; and wherein a common cooling medium inlet supplies the cooling medium to each of said plurality of cooling passages, the common cooling medium inlet being disposed adjacent to the common end.

12. The turbine component of claim 11, wherein said turbine component comprises a turbine bucket.

13. The turbine component of claim 11, wherein each of said plurality of cooling passages is defined in said platform on said pressure side of said airfoil.

14. The turbine component of claim 11, wherein each of said plurality of cooling passages is turbulated along its length.

15. The turbine component of claim 11, wherein each of said plurality of cooling passages has a curvature that varies along its length.

16. The turbine component of claim 11, comprising an airfoil cooling circuit at least partially disposed in said airfoil, said airfoil cooling circuit being in flow communication with said common cooling medium inlet.

17. The turbine component of claim 11, comprising a common cooling medium outlet in flow communication with each of said plurality of cooling passages, said common cooling medium outlet configured to expel the cooling medium from each of said plurality of cooling passages.

18. The turbine component of claim 17, wherein said common cooling medium outlet is in flow communication with an airfoil cooling circuit at least partially disposed within said airfoil.

19. The turbine component of claim 11, comprising a plurality of film cooling holes defined through a top surface of said platform, wherein the cooling medium flowing through said plurality of cooling passages is expelled through said plurality of film cooling holes.

20. A turbine component comprising:
a platform;
an airfoil extending radially upward from said platform, said airfoil including a pressure side and a suction side;
a plurality of non-concentric curved cooling passages defined in said platform, each of said plurality of cooling passages being configured to direct a cooling medium through said platform; and
wherein a common cooling medium inlet supplies the cooling medium to each of said plurality of cooling passages,
wherein a common cooling medium outlet is in flow communication with each of said plurality of cooling passages, said common cooling medium outlet configured to expel the cooling medium from each of said plurality of cooling passages.

\* \* \* \* \*